United States Patent
Nakagawa et al.

(10) Patent No.: US 6,585,600 B1
(45) Date of Patent: Jul. 1, 2003

(54) COMPETITIVE VIDEO GAME DEVICE, A COMPETITION VIDEO GAME EXECUTING METHOD AND A READABLE STORAGE MEDIUM IN WHICH A VIDEO GAME PROGRAM IS STORED

(75) Inventors: Eiji Nakagawa, Kakogawa (JP); Tetsuya Kondo, Nara (JP)

(73) Assignee: Konami Co., Ltd., Tokyo-to (JP)

( * ) Notice: Subject to any disclaimer, the term of this patent is extended or adjusted under 35 U.S.C. 154(b) by 0 days.

(21) Appl. No.: 09/569,949

(22) Filed: May 12, 2000

(30) Foreign Application Priority Data

May 13, 1999 (JP) .......................................... 11-133074

(51) Int. Cl.$^7$ .............................................. A63F 13/00
(52) U.S. Cl. ........................... 463/43; 463/7; 273/148 B
(58) Field of Search ............................. 463/43, 44, 42, 463/41, 40, 31, 30, 7, 8; 273/148 B

(56) References Cited

U.S. PATENT DOCUMENTS

| | | | |
|---|---|---|---|
| 4,738,451 A | * | 4/1988 | Logg |
| 5,390,937 A | * | 2/1995 | Sakaguchi et al. |
| 5,601,487 A | * | 2/1997 | Oshima et al. |
| 5,616,078 A | * | 4/1997 | Oh |
| 5,720,663 A | * | 2/1998 | Nakatini et al. |
| 5,735,743 A | * | 4/1998 | Murata et al. |
| 5,769,718 A | * | 6/1998 | Rieder |
| 5,807,174 A | * | 9/1998 | Fukuhara et al. |
| 5,863,248 A | * | 1/1999 | Mine et al. |
| 5,885,156 A | * | 3/1999 | Toyohara et al. |
| 6,093,105 A | * | 7/2000 | Morihira |
| 6,102,801 A | * | 8/2000 | Sugawara |
| 6,126,547 A | * | 10/2000 | Ishimoto |
| 6,146,269 A | * | 11/2000 | Morihira |
| 6,152,821 A | * | 11/2000 | Nakagawa et al. |
| 6,155,924 A | * | 12/2000 | Nakagawa et al. |

OTHER PUBLICATIONS

Notice of Reason for Rejection Mailed on Feb. 13, 2001 for Japanese Patents Application 11-133074, Feb. 2001.*
Corpse Killer, created, produced and published by Digital Pictures, Inc. 1994.*

* cited by examiner

*Primary Examiner*—Michael O'Neill
(74) *Attorney, Agent, or Firm*—Jordan and Hamburg LLP

(57) ABSTRACT

A competition video game device for displaying a plurality of simulated games played between an own team and an enemy team on a display means by causing n ($\geq 1$) player characters to participate and play in the games, comprises a first storage means for storing m ($>n$) player characters belonging to the own team, a player selection control means for selecting at least n player characters to participate in the simulated game from the m player characters before each simulated game, and a condition setting means for setting the player character whose consecutive non-participating game number up to the last simulated game is equal to or larger than a specified number in the game sense reduced condition, in which his movements are sluggish when he participates in the simulated game, at a specified probability.

13 Claims, 11 Drawing Sheets

FIG. 4

SCORING
SHOOTING
CURVE
RUN SPEED
DASHING
STRENGTH
JUMP
BALL KEEPING
DEFENSE
PASSING
HANDEDNESS
GOAL KEEPING
GOAL KICK
OFFENSE MENTALITY
DEFENCE MENTALITY

FIG. 5

| n | PLAYER | ABILITY INDEX |
|---|---|---|
| 1 | YAMAZAKI | 72,57,54,75,85,80,78,60,56,43,71,14,11,57,78 |
| 2 | SHIMIZU | 70,63,69,79,74,65,68,65,70,75,········· |
| ⋮ | ⋮ | ⋮ |
| 25 | NAKAGAWA | 40,45,76,77,82,86,92,77,72,79,········· |

COMPETITIVE VIDEO GAME DEVICE, A COMPETITION VIDEO GAME EXECUTING METHOD AND A READABLE STORAGE MEDIUM IN WHICH A VIDEO GAME PROGRAM IS STORED

The present invention relates to a competition video game device using an optical disk, magnetic disk, semiconductor memory or a like storage medium storing a program data, a competition video game executing method and a readable storage medium storing a game program.

BACKGROUND OF THE INVENTION AND RELATED ART STATEMENT

Quite a number of video game systems have been proposed, including systems comprised of a special home-use machine and a television monitor, special commercial systems, and systems comprised of a personal computer or work station, a display and an audio output machine. Any of these systems is comprised of a controller operated by a game player, a storage medium storing a game program data, a CPU for executing controls for the generation of audio sounds and images based on the game program data, a processor for generating images, a processor for generating audio sounds, a CRT monitor for displaying the images, and a loudspeaker for outputting the audio sounds. The storage medium is frequently a CD-ROM, semiconductor memory or cassette having a built-in semiconductor memory.

A variety of kinds of games are known. Among these known games, competition video games in which many player characters are displayed to play a game on a monitor screen, e.g. a soccer game are known. The soccer game is played by giving instructions of specific motions such as dribble, pass and shoot to an own player character through a controller, and can be said to be an interesting video game having high gaming nature and competition nature.

In the soccer game of this kind, abilities relating to the soccer game such as a scoring ability, shooting ability, ball-curving ability, speed and dashing ability are set as ability indices in values of 0 to 99 for each player character so as to provide it an individuality, and the respective ability indices are displayed on the monitor so as to serve as criteria when a game player selects the player characters to participate in a game.

However, in the conventional soccer game, the selection of the player characters by the game player tends to be fixed unless such an event as to make it impossible for the player character to participate in a next game due to, for example, an injury during the game occurs. The selection of the player characters before the game has been monotonous.

SUMMARY OF THE INVENTION

In view of the above problem residing in the prior art, an object of the present invention is to provide an interesting competition video game device which causes a game player to select player characters in an actual manager's place by setting a condition of player characters having stayed out of games at so-called "out-of-touch with games" condition to thereby influence ability indices of the player characters, a competition video game executing method, and a readable storage medium in which a game program is stored.

The invention is directed to a competition video game device for displaying a plurality of simulated games played between an own team and an enemy team on a display means by causing n ($\geq 1$) player characters to participate and play in the games, comprising a first storage means for storing m (>n) player characters belonging to the own team, a player selection control means for selecting at least n player characters to participate in the simulated game from the m player characters before each simulated game, and a condition setting means for setting the player character whose consecutive non-participating game number up to the last simulated game is equal to or larger than a specified number in the game sense reduced condition, in which his movements are sluggish when he participates in the simulated game, at a specified probability.

With this construction, a plurality of simulated games played between the own team and the enemy team are displayed on the display means by causing n ($\geq 1$) player characters to participate and play in the games. At this time, at least n player characters to participate in the simulated game are selected from the m (>n) player characters belonging to the own team before each simulated game. Out of the m player characters, the player character whose consecutive non-participating game number up to the last simulated game is equal to or larger than the specified number is set in the game sense reduced condition, in which his movements are sluggish when he participates in the simulated game, at the specified probability. Accordingly, more planning is required for the selection of the player characters which has been monotonous, thereby making the game more interesting.

BRIEF DESCRIPTION OF THE DRAWINGS

FIG. 4 is a diagram illustrating disposition items relating to soccer, FIG. 5 is a table showing an example of ability indices representing degrees of ability of the dispositions.

DETAILED DESCRIPTION OF THE PREFERRED EMBODIMENTS OF THE INVENTION

Figure 1:
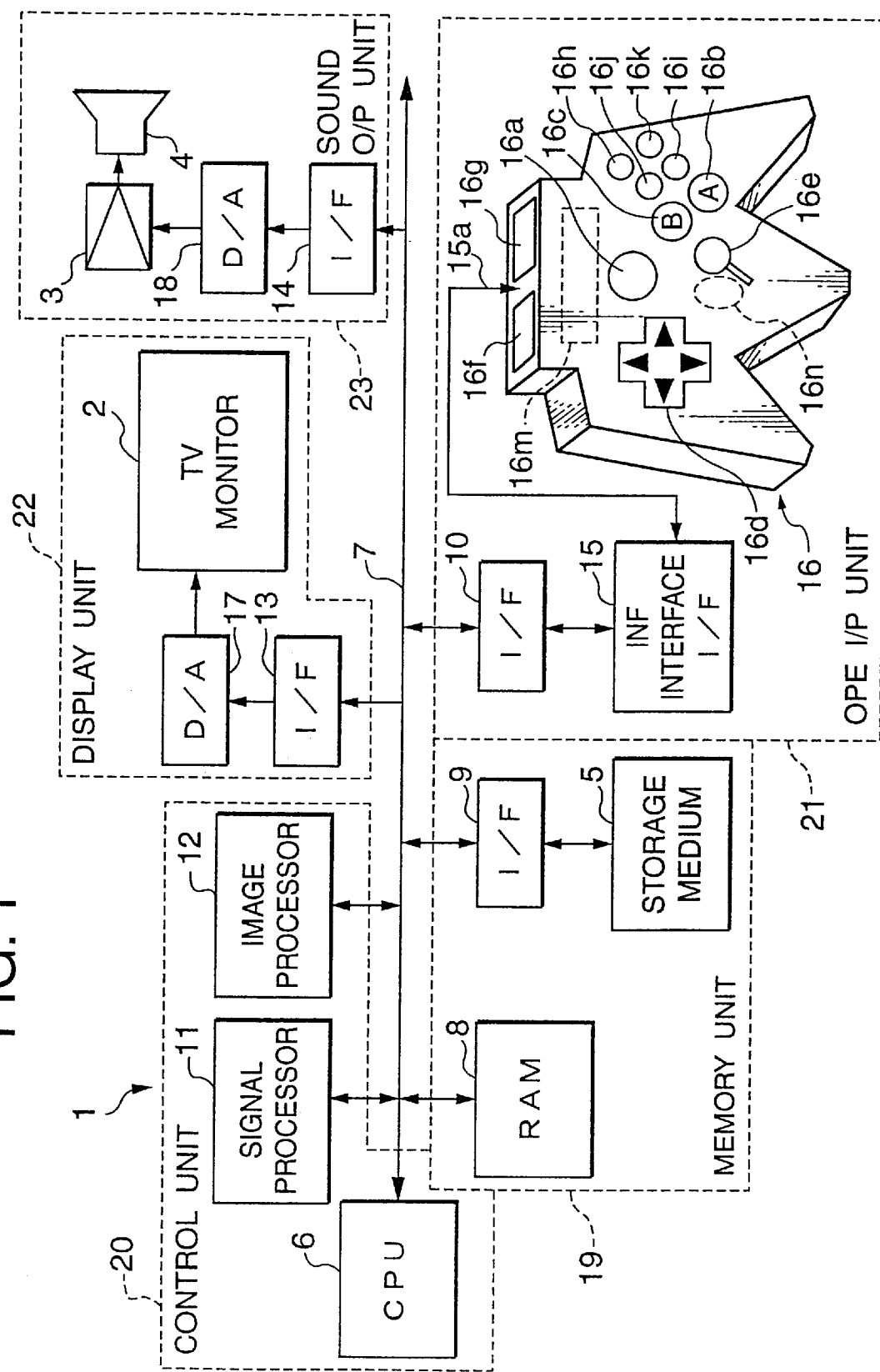
FIG. 1 is a block diagram of a game system as one embodiment of a competition video game device according to the invention.

FIG. 1 is a block diagram of a game system as one embodiment of a competition video game device according to the invention.

This game system 1 is provided with a main game unit, a television monitor 2 for outputting images of a game, an amplifying circuit 3 and a loudspeaker 4 for outputting sounds of the game, and a storage medium storing game data including images, audio sounds, and program data. Here, the storage medium 5 is, for example, a so-called ROM cassette in which a ROM or the like storing the game data and program data of an operating system is contained in a plastic casing, an optical disk, or an flexible disk.

The main game unit is constructed by connecting a bus 7 comprised of addresses, data and a controller bus to a CPU 6, connecting a RAM 8, interface circuits 9 and 10, a signal processor 11, an image processor 12, and interface circuits 13 and 14 to the bus 7, respectively, connecting a controller 16 to the interface circuit 10 via an operational information interface circuit 15, connecting a digital-to-analog (D/A) converter 17 to the interface circuit 13, and connecting a digital-to-analog (D/A) converter 116 to the interface circuit 14.

A memory unit 19 is constructed by the RAM 8, interface circuit 9 and storage medium 5. A control unit 20 for controlling a progress of the game is constructed by the CPU 6, signal processor 11 and image processor 12. An operation input unit 21 is constructed by the interface circuit 10, operational information interface circuit 15 and controller 16. An image display unit 22 is constricted by the television monitor 2, interface circuit 13 and D/A converter 17. A sound output unit 23 is constructed by the amplifying circuit 3, loudspeaker 4, interface circuit 14 and D/A converter 18.

The signal processor 11 is mainly adapted for the calculation in a three-dimensional (3D) space, the calculation to transform a position in the 3D space into the one in a simulated 3D space, the light source calculation, and the generation and processing of sound data.

The image processor 12 is adapted to write an image data in the RAM 8 in accordance with the calculation result of the signal processor 11: for example, to write (paste) a texture data in an area of the RAM 8 designated by a polygon.

The controller 16 functions as an operation means operated by a game player and includes a start button 16a, A-button 16b, B-button 16c, cross key 16d, stick-shaped operation unit 16e, left trigger button 16f, right trigger button 16g, C1-button 16h, C2-button 16i, C3-button 16j, C4-button 16k and rear trigger button 16n.

The controller 16 also includes a connector 16m. A card memory 16 (see FIG. 3) including a nonvolatile memory for temporarily saving a progress of the game, for example, when the game is interrupted is detachably mountable on the connector 16m.

The stick-shaped controller 16e has substantially the same construction as a joystick. Specifically, the controller 16e has an upright stick which is inclinable in any direction of 360° including up, down, left and right about a specified position as a pivot. According to the inclining direction and angle of the stick, X-coordinate and Y-coordinate of the position along transverse direction and forward/backward directions having the upright position as an origin are fed to the CPU 16 via the interface circuits 15, 10.

This game device has different modes depending upon its application. More specifically, if the game system 1 is constructed to be used at home, the television monitor 2, amplifying circuit 3 and the loudspeaker 4 are separate from the main game unit. If the game device is constructed to be used on a commercial basis, all the parts shown in FIG. 1 are accommodated as a unit in a signal container.

Further, if the game system 1 is constructed by a personal computer or a work station as a core, the television monitor 2 corresponds to a display of the computer; the image processor 12 corresponds a part of the game program data stored in the storage medium 5 or a hardware on an extension board mounted on an extension slot of the computer; and the interface circuits 9, 10, 13, 14, D/A converter 17, 18 and operation information interface circuit 15 correspond to the hardware on the extension board mounted on the extension slot of the computer. Further, the RAM 8 corresponds to a main memory of the computer or the respective areas of an extension memory. In this embodiment, an example in which the game system 1 is constructed to be used at home is described.

Next, the operation of the game system 1 is schematically described. When a power switch (not shown) is turned on to apply a power to the game system, the CPU 6 reads image data, sound data and game program data from the storage medium 5 in accordance with an operating system stored in the storage medium 5. A part or all of the read image data, sound data and game program data are stored in the RAM 8.

Thereafter, the CPU 6 progresses a game based on the game program data stored in the RAM 8 and contents of instructions given from a game player via the controller 16. In other words, the CPU 6 suitably generates commands as tasks to output images and sounds based on the contents of instructions given from the game player via the controller 16.

The signal processor 11 performs the position calculation of characters in the 3D space (the same applies to the two-dimensional (2D) space), the light source calculation, the sound data generation, and processing in accordance with the commands.

Subsequently, the image processor 12 writes an image data to be displayed in a display area of the RAM 8. The image data written in the display area of the RAM 8 is fed to the D/A converter 17 via the interface circuit 13, where it is converted into an analog video signal and then fed to the television monitor 2 to be displayed on its display surface as an image.

On the other hand, the sound data outputted from the signal processor 11 is fed to the D/A converter 18 via the interface circuit 14, where it is converted into an analog sound signal and then outputted as a sound from the loudspeaker 4 via the amplifying circuit 3.

Next, writing of texture data by the image processor 12 is described with reference to FIG. 1.

As described above, the signal processor 11 performs calculation in accordance with the command from the CPU 6, and the image processor 12 writes the image data to be displayed in the display area of the RAM 8.

The RAM 8 includes a non-display area and a display area (frame buffer), and the polygon data stored in the storage medium 5, texture designation data and color data (texture data) and like data are stored in the non-display area.

Here, polygons are polygonal 2D simulated figures for constructing objects, i.e. models and characters set in the game space. In this embodiment, triangular and rectangular polygons are used. Textures are 2D images to be pasted to the polygons to form an image, and color data are for designating the color of the textures.

A polygon data which is coordinate data of apices of a polygon and a texture designation data for designating a texture corresponding to the polygon are stored in pair.

Commands generated by the CPU 6 to form images (imaging commands) include the one for forming a 3D image using polygons and the one for forming usual 2D images.

The imaging command for forming a 3D image using polygons is comprised of a polygon apex address data in the non-display area of the RAM 8, texture address data representing stored positions of texture data to be pasted to the polygons in the RAM 8, color address data representing stored positions of color data indicating the colors of the texture data in the RAM 8, and luminance data representing the luminance of the textures.

Among these data, the polygon apex address data in the non-display area of the RAM 8 are obtained as follows. The signal processor 11 applies a coordinate transformation and perspective projection to the polygon apex coordinate data in the 3D space from the CPU 6 based on a motion amount data and a rotation amount data of the video screen itself (eye position), thereby replacing them by polygon apex coordinate data in the 2D space.

The polygon apex coordinate data in the 2D space represent addresses in the display area of the RAM 8, and the image processor 12 writes the texture data represented by the texture address data allotted in advance in a range of the display area of the RAM 8 represented by three or four polygon apex address data. In this way, objects (for example, player characters of the own and enemy teams, referee, field, goal net, stands, speculators in this embodiment) presented by pasting the textures to the respective polygons are displayed on the display surface of the television monitor 2.

Figure 2:
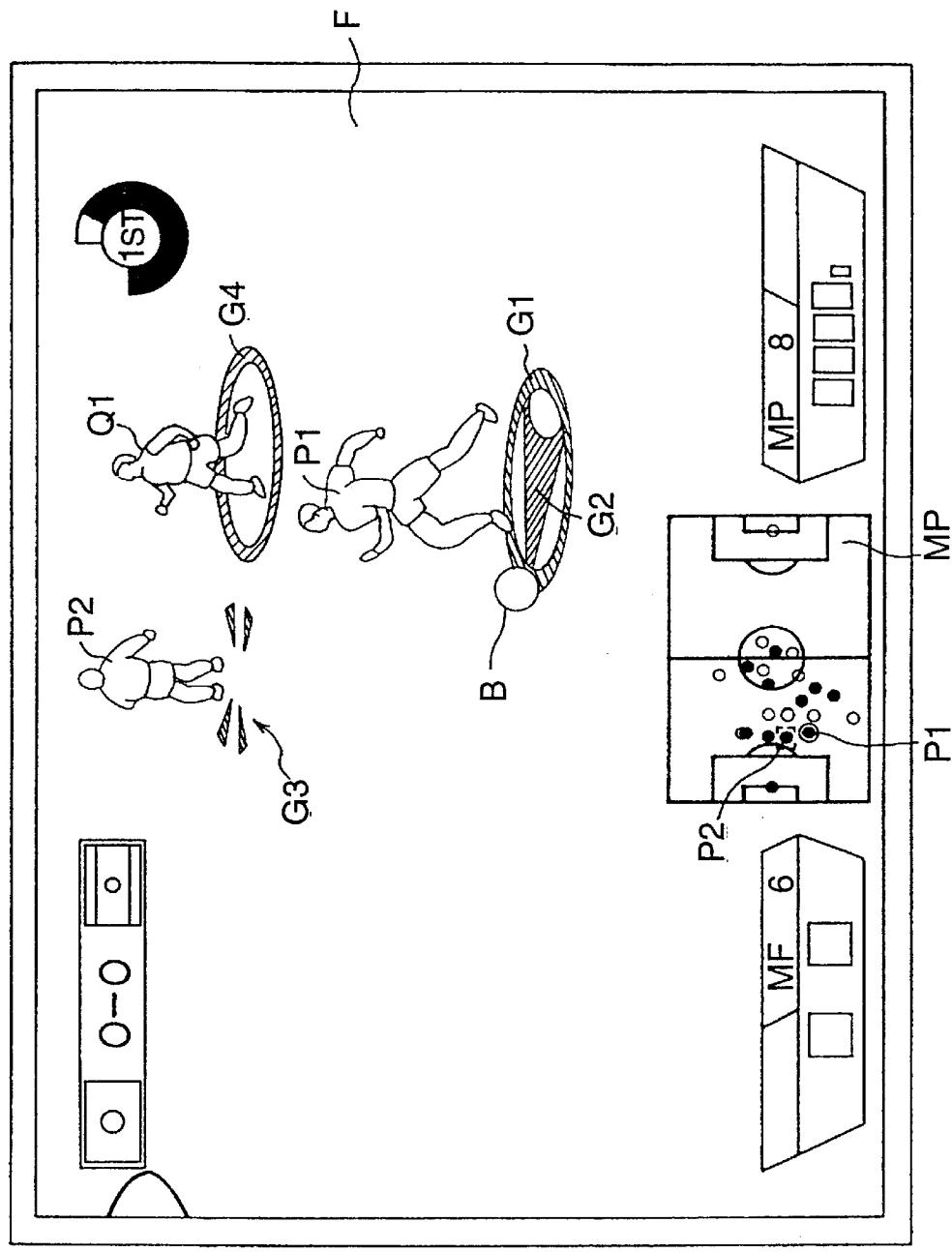
FIG. 2 is a diagram illustrating one scene of a soccer video game.

Next, the summary of the soccer video game performed by this game system is described with reference to FIG. 2. FIG. 2 is a diagram illustrating one scene of the soccer video game. A win-loss card and a score are displayed at upper left of the screen; a remaining time at upper right thereof, a name (MF 6 in this example) of the player presently operated by the game player at the lower left thereof, and a name of a player of the enemy team near MF6 (MP 8, in this example) at the lower right.

On the game screen, a field F is displayed, and a player P1 operated by the game player, a player Q1 of the enemy team near the player P1 and a player P2 of the team of the player P1 who is near the player P1 are displayed substantially in the middle of the screen. The player P1 operated by the game player is a player who basically keeps a ball, and a ring-shaped guide G1 is displayed on a field plane at the feet of the player P1 in order to make him easily distinguishable from other players. Further, a guide G2 indicating a moving direction of the player P1 or a direction of a ball character B from the feet of the player P is displayed in a color different from that of the guide G1 so that the moving direction of the player P1 is easily recognizable.

A guide G3 radially extending in four directions from the feet is displayed in the same color as the guide G1 at the player P2 near the player P1, i.e. the player P2 whom the player P1 basically gives a pass. Even if the player P2 moves out of the screen and accordingly the guide G3 disappears, a part of the guide G3 is displayed at an end of the screen along the disappearing direction of the player P2 so as to suitably guide a direction in which the player P1 should give a pass.

On the other hand, a ring-shaped guide G4 is displayed in a color different from that of the guide G1 at the feet of the enemy player Q1 near the player 1 in order to warn the game player.

Here, how an instruction is given to move the player P1 is briefly described. The player P1 is operated based on instructions given through the respective buttons of the controller 16. The game player can also set an operation pattern suitable to him. As an example, a moving direction by dribbling is instructed by the stick-shaped controller 16*e* during offense. Other movements are performed using the other buttons simultaneously with the stick-shaped controller 16*e*: for instance, "pass" by the A-button 16*b*; "shoot" by the B-button 16*c*; "through pass" by the C1-button 16*h*; "dash" by the C2-button 16*i*; "fly ball" by the C3-button 16*j*; "one-two pass" by the C4-button 16*k*. During defense, motions are instructed to the player Q1 according to a desired operation pattern by using the above buttons.

Figure 3:
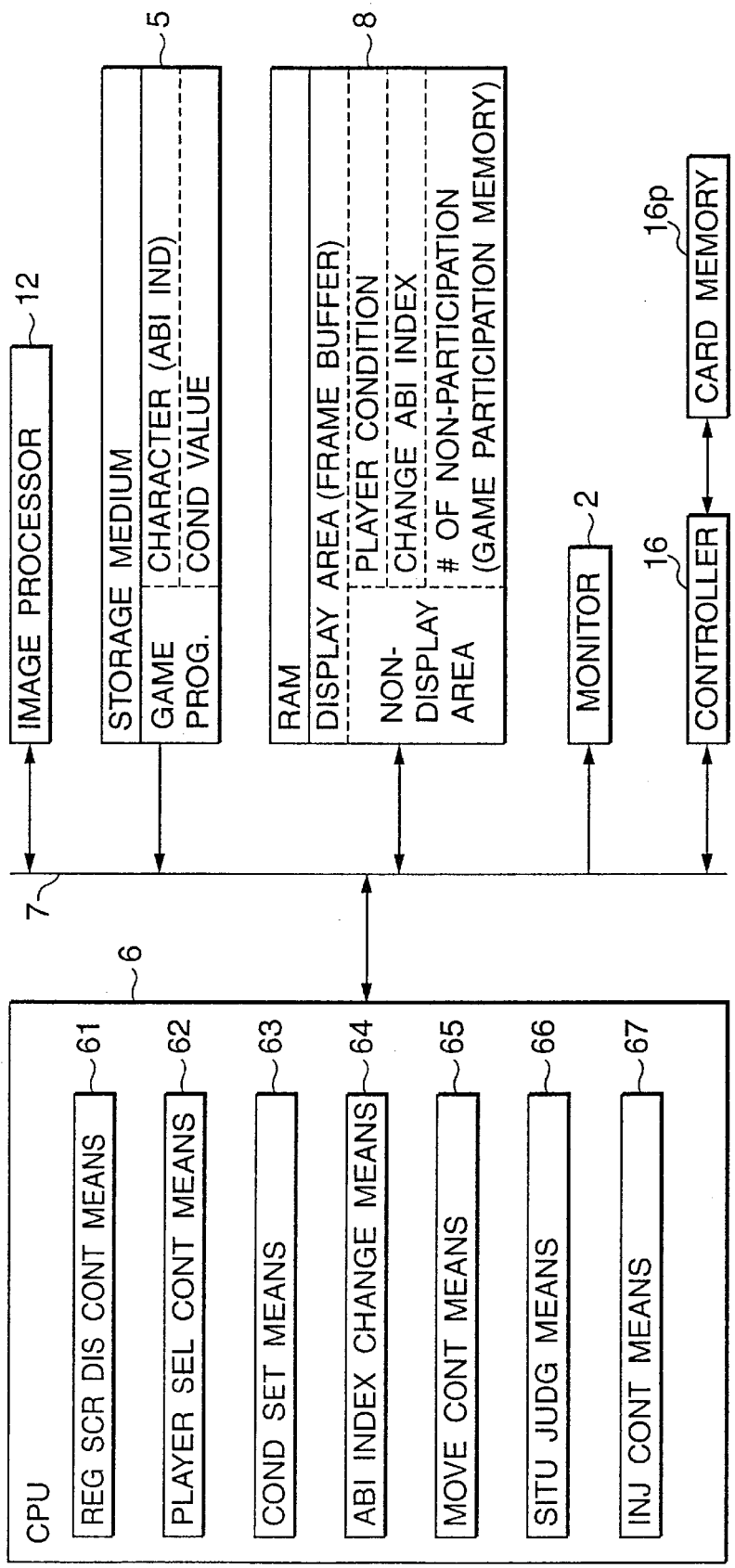
FIG. 3 is a block diagram illustrating a functional block of a CPU and a part of elements of FIG. 1.

In FIG. 3, a game program including various soccer game modes to be described later is stored in the storage medium 5, so that soccer games can be performed based on the soccer rules.

The game program stored in the storage medium include data concerning m player characters (first storage means). If n (1≧n) denotes the number of players to participate in a game, n=11 since the game is a soccer game in this embodiment. m is set: n<m (e.g. m=25 in this embodiment).

Further, ability indices representing degrees of ability of dispositions relating to the soccer game are stored for each player character (third storage means). In this embodiment, disposition items include a scoring ability, shooting ability, ability to curve a shot ball, running speed, dashing ability, physical strength, jumping ability, ball-keeping ability, defense ability, passing ability, goal-keeping ability, offense mentality and defense mentality as shown in FIG. 4.

FIG. 5 is a table showing exemplary ability indices representing degrees of ability of dispositions. Ability indices are set with respect to all the disposition items shown in FIG. 4 for player characters of a certain team "Yamazaki", "Shimizu", . . . "Nakagawa". For example, ability indices "72, 57, 54, . . . , 78" are set in the order of disposition items of FIG. 4 for "Yamazaki", and ability indices "40, 45, 76, 77, . . . " (see an upper right table in FIG. 7) are set for "Nakagawa".

Referring back to FIG. 3, the game program of the storage medium 5 includes numerical values representing conditions of the player characters (player condition values). Player conditions include "very bad", "bad", "normal", "good", "very good", "angry" and "out-of-touch with games" (game sense reduced condition) to be described later. Three kinds of condition values can be set.

First condition values C1 represent temporary changes of the ability indices during the game and are added to the ability indices. The first condition values C1 are set: "very bad condition: −4", "bad condition: −2", "normal condition: 0", "good condition: 2", "very good condition: 4", "angry condition: 15", and "out-of-touch with games: −12".

Second and third condition values C2, C3 are used for an injury control routine as described later. The second condition values C2 are set: "very bad condition: 1", "bad condition: 2", "normal condition: 4", "good condition: 5", "very good condition: 6", "angry condition: 6", and "out-of-touch with games: 2". The third condition values C3 are set: "very bad condition: 3", "bad condition: 2", "normal condition: 1", "good condition: 0", "very good condition: 0", "angry condition: 0", and "out-of-touch with games: 2".

In FIG. 3, the player conditions are stored in the non-display area of the RAM 8 for the respective player characters. Changed ability indices obtained by adding the first condition values C1 to the ability indices peculiarly set for the respective player characters are also stored in the non-display area of the RAM 8.

The non-display area of the RAM 8 is provided with a game participation memory (second storage means) for saving the number of games in which each player character has consecutively not participated (hereinafter, "consecutive non-participating game number". This game participation memory is for saving the consecutive non-participating game number of each of the player character who did not participate in the game upon completion of each game. It should be noted that the consecutive nonparticipating game number of the player characters who participated in the game is reset to 0.

The CPU 6 is, as shown in FIG. 3, provided with a registration screen display control means 61, a player selection control means 62, a condition setting means 63, an ability index changing means 64, a movement control means 65, a situation judging means 66 and an injury control means 67 as functional blocks. The CPU 6 also has timer and calendar functions for the administration of a game time (soccer playing time) and schedules such as leagues.

Figure 6:
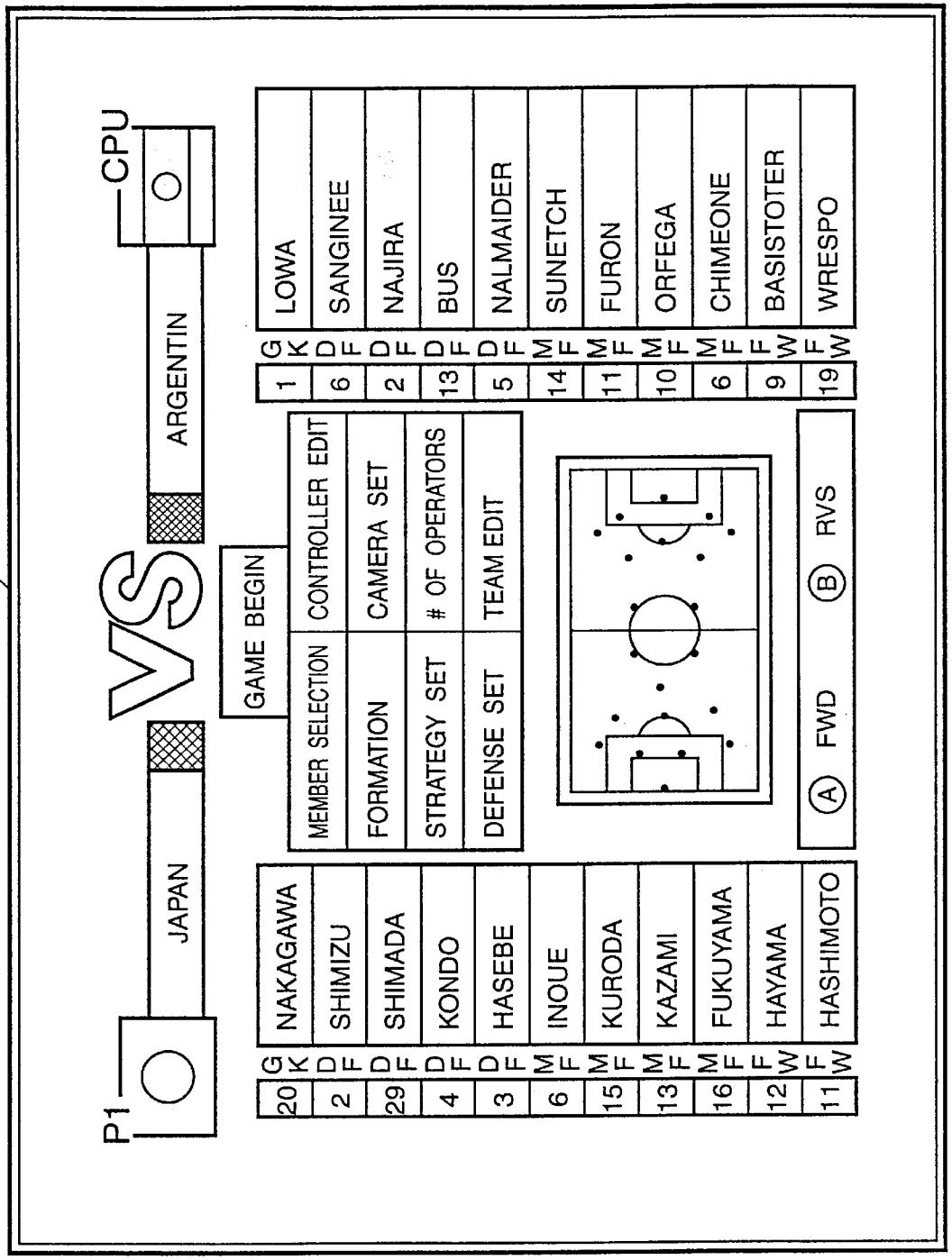
FIG. 6 is a diagram illustrating an edit/select screen.

The registration screen display control means 61 has a function of displaying various registration screens on the monitor 2 prior to the start of the game. First, a game mode setting screen is displayed with icons. Game modes include, for example, "National League" and "World Cup Tournament". When the game player places a cursor on a desired icon position by operating the cross key 16d and presses the A-button 16d, the screen is switched to the one corresponding to the designated game mode. Here, if "World Cup Tournament" is designated, a "Game Setting" screen is displayed to permit setting of an enemy team or the like. FIG. 6 shows an edit/select screen displayed before the start of the game. Player characters of the Japanese team and Argentinean team to compete with each other are displayed in list format.

Figure 7:
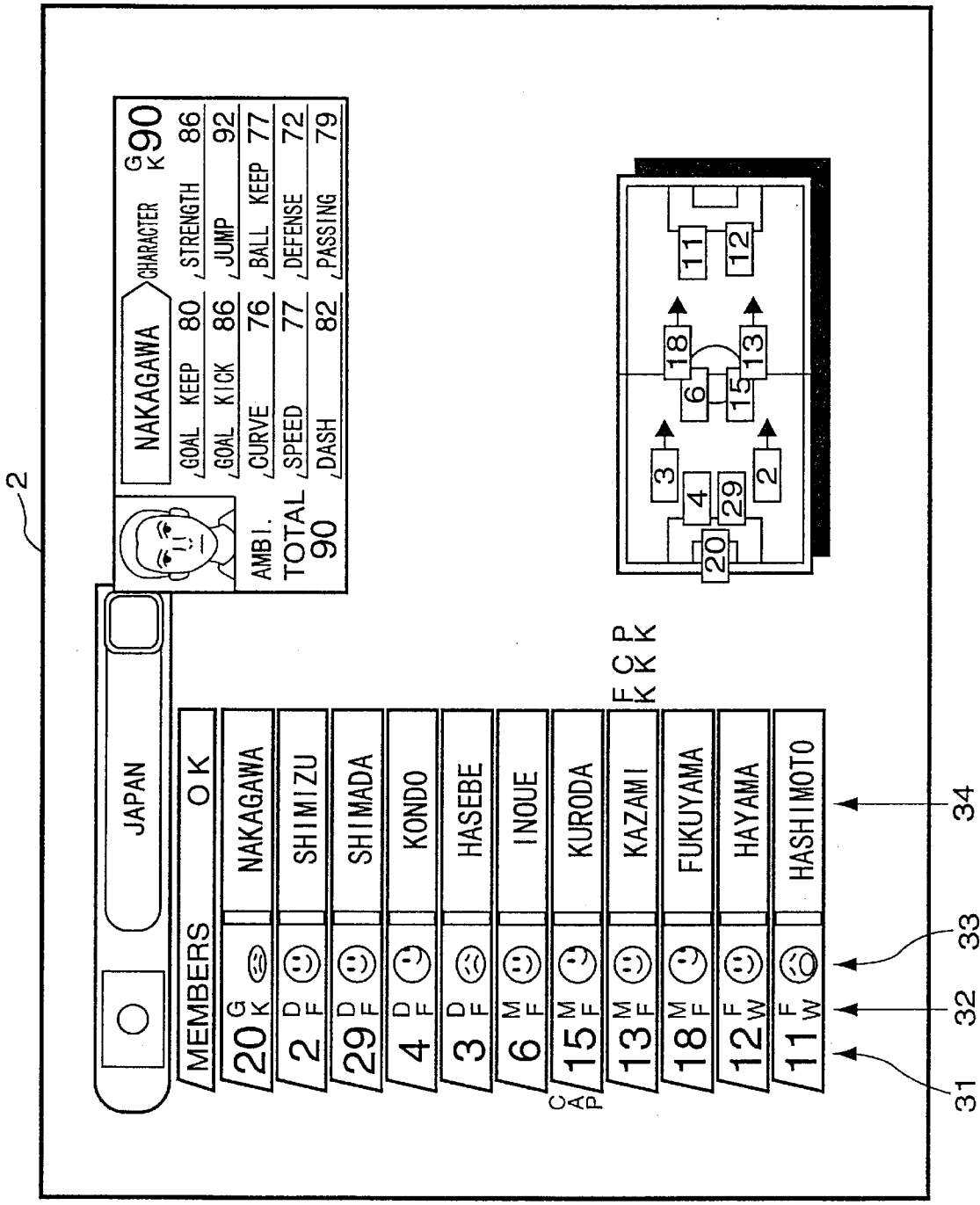
FIG. 7 is a diagram illustrating a member select screen.

When the game player places the cursor on a "Member Select" position by operating the cross key 16d and presses the A-button 16b, a "Member Select" screen as shown in FIG. 7 is displayed.

On the "Member Select" screen, a vertical list of the player characters including uniform numbers 31, positions 32 such as GK (goalkeeper), FW (forward), MF (midfield), and DF (defender), their face marks 33 representing their conditions and their names 34 is displayed in the left half of the monitor 2 as shown in FIG. 7.

In FIG. 7, the face mark representing "very good" condition is displayed at "4: Kondo", "15: Kuroda", "18: Fukuyama"; the face mark representing "good" condition is displayed at "2: Shimizu", "29: Shimada", "6: Inoue", "13: Kazami" and "12: Hayama"; the face mark representing "bad" condition is displayed at "11: Hashimoto"; the face mark representing "very bad" condition is displayed at "3: Hasebe" and the face mark representing "out-of-touch with games" condition is displayed at "20: Nakagawa".

In this way, the registration screen display control means 61 has a function as a condition display control means for distinguishably displaying on the monitor 2 that the condition of the player character is set at "out-of-touch with games" condition.

The face marks representing the conditions may be distinguished by different colors in addition to the mode as shown in FIG. 7. In such a case, for example, "very good" condition may be displayed in red, "very bad" condition in blue and "out-of-touch with games" condition in purple, i.e. the conditions may be expressed by different wavelengths.

In the upper half of the right side of the monitor 2, the aforementioned ability indices of the disposition items of the player character ("20: Nakagawa" in FIG. 7) designated by placing the cursor thereon through the operation of the cross key 16d and pushing the A-button 16d are displayed.

In the lower half of the right side of the monitor 2, the field is displayed together with the position (indicated by the corresponding uniform number) of the designated player character so that the position can be adjusted within an area by the cross key 16d. Here, the area refers to the one which basically is set for each position and does not overlap areas of neighboring positions.

Referring back to FIG. 3, the player selection control means 62 has a function of controlling the selection of the player characters for an own team (for example, Japanese team in this embodiment) the game player controls by operating the controller 16 while the member select screen of FIG. 7 is displayed on the monitor 2. The selection of the player characters may be done according to each position while attaching importance to preferable disposition items. This selection is done by placing the cursor on a desired player character by operating the cross key 16d and pressing the A-button 16b, and the player selection control means 62 registers the data corresponding to each selected player character in an specified area of the non-display area of the RAM 8. In FIG. 7, a display frame of the player character being designated ("20: Nakagawa" in FIG. 7) in the list is distinguishably displayed. Upon completion of the selection of the player characters, the selected player characters are confirmed by placing the cursor on the position of an icon "Members OK" by operating the cross key 16d and pressing the A-button 16b.

The player selection control means 62 also has a function of suitably exchanging player characters upon an occurrence of an injury event of the player character during the soccer game or at an arbitrary timing.

The condition setting means 63 has following functions.

(1) Function as a participation judging means for judging whether each player character participated in the game upon completion of the game.

(2) Function as a storage control means for saving a consecutive non-participating game number up to the game in the game participation memory of the RAM 8 for each player character. In other words, the consecutive non-participating game number is reset to "0" for the player characters who participated in the game while increasing it by 1 for those who did not.

(3) Function as a consecutive non-participating game number judging means for judging whether the consecutive non-participating game number of each player character is equal to or larger than a specified number N (e.g. N=4 in this embodiment) before he is selected.

(4) Function of setting the player character whose consecutive non-participating game number is equal to or larger than the specified number N in "out-of-touch with games" condition in a procedure described later. This "out-of-touch with games" condition expresses a reduction of game sense of the player character who have not played in games in a simulated manner. This condition influences the movements of the player character by reducing the ability indices in a procedure described later.

(5) Function of setting the player characters whose consecutive non-participating game number has reached the specified number and those whose consecutive non-participating game number has not reached the specified number to any of "very bad" condition, "bad" condition, "normal" condition, "good" condition, "very good" condition and "angry" condition randomly or in a procedure defined in advance.

The ability index changing means 64 has a function of temporarily changing the ability indices of the aforementioned respective disposition items in a procedure described later only during the game and a function of saving the changed ability indices in the RAM 8.

The movement control means 65 has a function of controlling the movements of the player characters during the game in conformity with actual soccer rules according to instructions from the controller 16. Here, the above changed ability indices are used as the ability indices of the player characters.

In this embodiment, both a one-person play in which the selected player characters of the game player's team compete with player characters controlled by the CPU 6 of an enemy team selected by the CPU 6 or the game player using one controller 6 and a two-persons play with which two game players select their own teams and cause the selected teams to compete with each other using two controllers 16 can be performed.

In the case of the one-person play, the controller 16 gives various offense movement instructions to the player character keeping a ball character out of those of the own team. If the ball character is on the enemy team side, the controller 16 gives various defense movement instructions to the player character of the own team closest to the enemy player character keeping the ball character. For the other player characters, the movement control means 65 administers and controls the positions of the respective player characters by conducting calculation in accordance with a game program maximally conforming to actual soccer rules, so that the game smoothly progresses and the entire game movement approximates to the entire movement of an actual soccer game.

In the case of the two-persons play, the player character keeping the ball character and the player character of the enemy team closest to the former player are motion-controlled by the respective controllers 16. The other player characters are motion-controlled in conformity with the soccer rules substantially in the same manner as described above.

The situation judging means 66 has a function of judging an occurrence of a specified soccer-related situation, for example, a foul play or contact given to the player character of the own team from the player character of the enemy team.

The injury control means 67 has a function of judging whether to injure the player character of the own team in a procedure described later when the above specified situation occurs. Here, an injury rate increases as shown in the later-described procedure if this player character is in "out-of-touch with games" condition.

Figure 8:
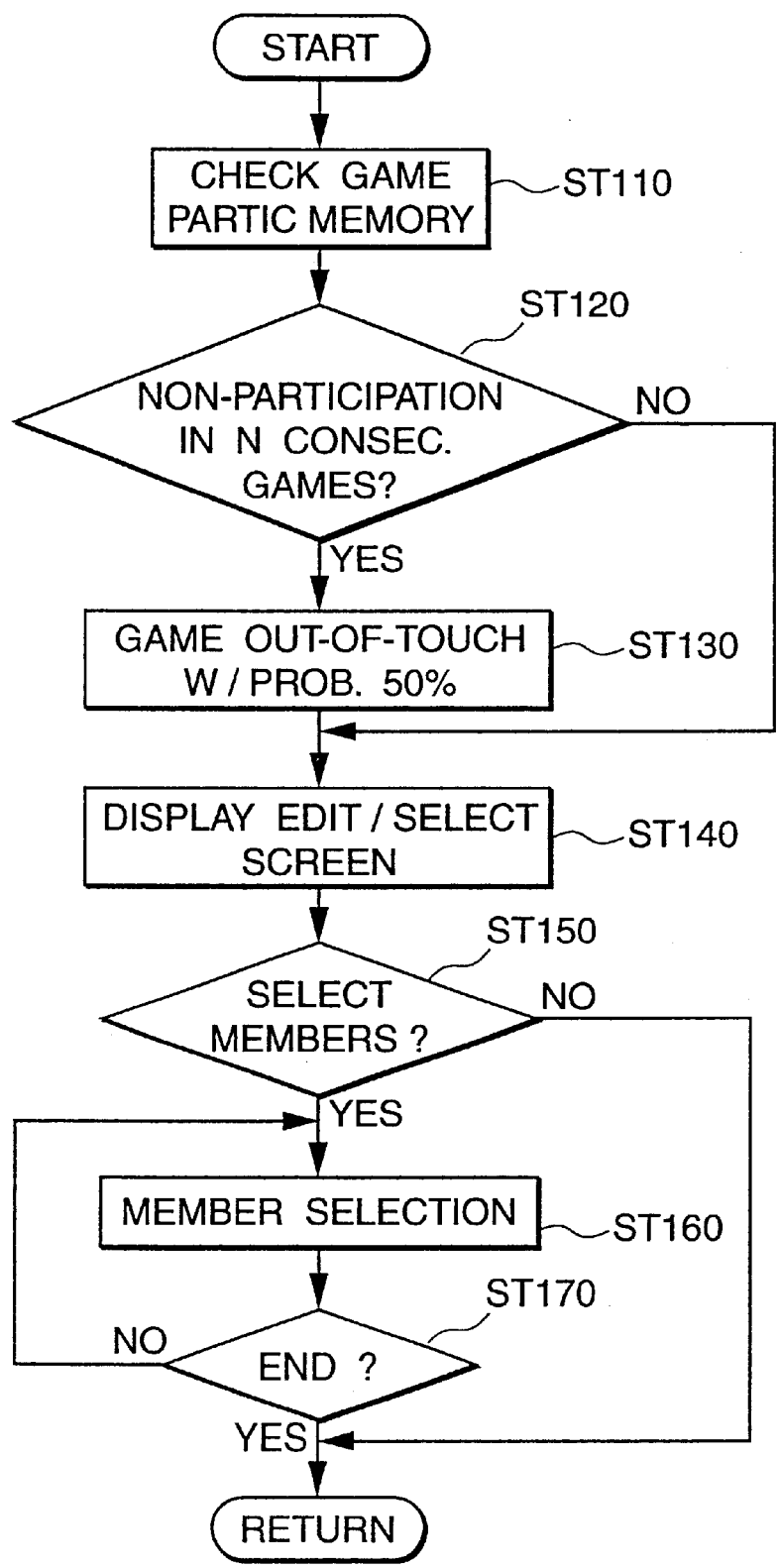
FIG. 8 is a flowchart showing an "Out-of-Touch with Games" setting routine by a condition setting means and a "player character selection" routine by a player selection control means which are executed before the start of a game.

FIG. 8 is a flowchart including an "out-of-touch with games" condition setting routine by the condition setting means 63 and a player character selecting routine by the player selection control means 62 which are executed before the start of the game.

First, the game participation memory of the RAM 8 is checked (Step ST110) to judge whether the player character has not participated in last N (e.g. N=4 in this embodiment) consecutive games (Step ST120). This flow ends if he has not (No in Step ST120), whereas the condition of the player character is set at "out-of-touch with games" at a probability of 50% if he has (YES in Step ST120). The above procedure is executed for each of m (e.g. m=25 in this embodiment) player characters belonging to the own team. Steps ST110 to ST130 construct the "out-of-touch with games" condition setting routine, which is executed before the start of each game.

Next, an edit/select screen as shown in FIG. 6 is displayed on the monitor 2 (Step ST140). If "Member Select" is designated in this state (YES in Step ST150), a member select screen as shown in FIG. 7 is displayed to permit the selection of the player characters (Step ST160). If "Members OK" is designated (YES in Step ST170), this routine ends. The selection of the player characters in Step ST160 is continued so long as "Members OK" is not designated (NO in Step ST170). On the other hand, if "Member Select" is not designated (NO in step ST150, this routine ends by, for example, designating "Member Select" to start a game. Steps ST140 to ST170 construct the player character selecting routine.

As described above, the conditions of the player characters are set at "out-of-touch with games" at a probability of 50% in Step ST130 by executing the "out-of-touch with games" setting routine before the start of each game. Accordingly, even if the condition of a certain player character is set at "out-of-touch with games" because his consecutive non-participating game number is equal to or larger than the specified number N, it may not be set at "out-of-touch with games" before the start of a next game. This makes it possible to avoid the selection of the player character whose condition is set at "out-of-touch with games", thereby making the selection of the player characters more interesting.

Figure 9:
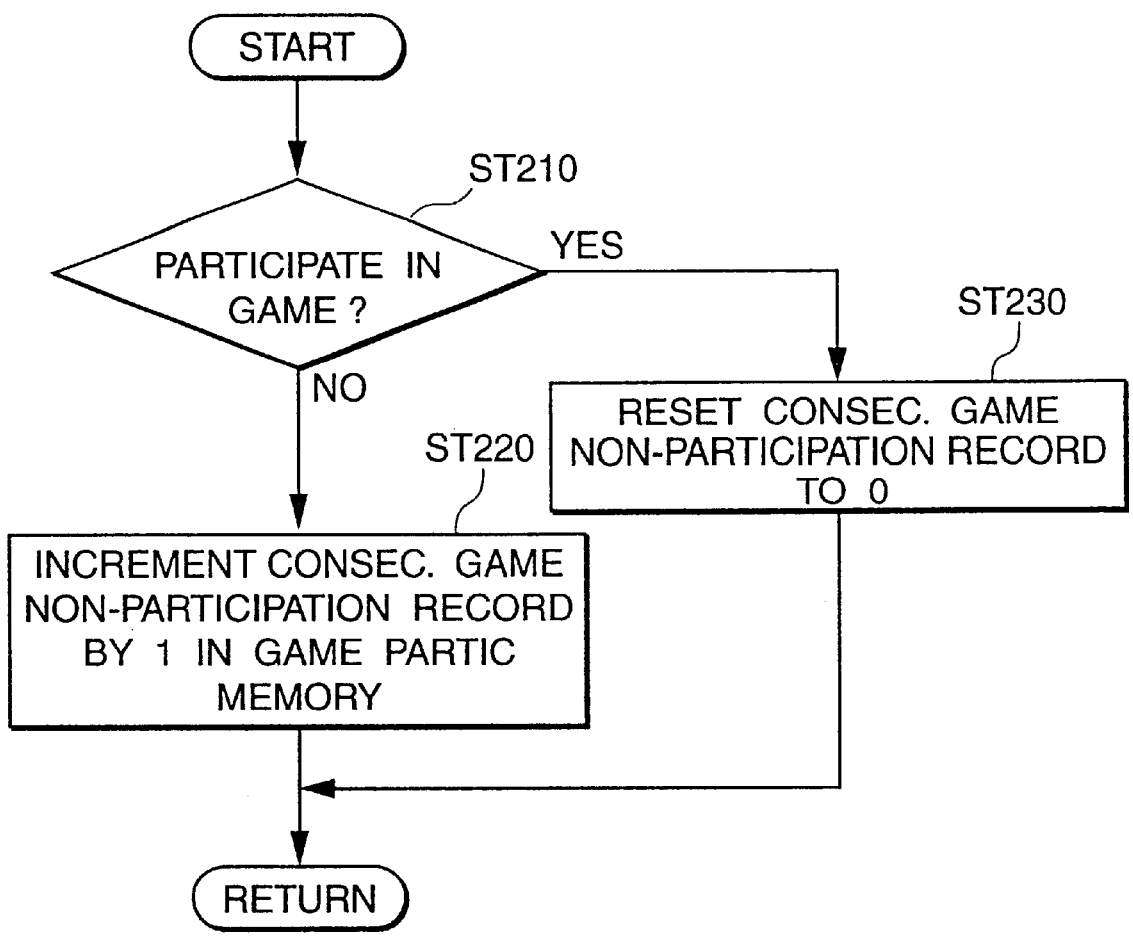
FIG. 9 is a flowchart showing a "Game Participation Judgment" routine by a game participation judging function of the condition setting means which is executed after the end of the game.

FIG. 9 is a flowchart showing a procedure of a game participation judging routine executed by the game participation judging function of the condition setting means 63 after the end of the game.

First, whether the player character participated in the game is judged (Step ST210). If he did not (NO in Step ST210), the consecutive non-participating game number saved in the game participation memory of the RAM 8 is incremented by 1 (Step ST220). On the other hand, if he did (YES in step ST210), the consecutive non-participating game number saved in the game participation memory of the RAM 8 is reset to 0 (Step ST230). The above procedure is executed for each of m (m=25 in this embodiment) player characters belonging to the own team.

Figure 10:
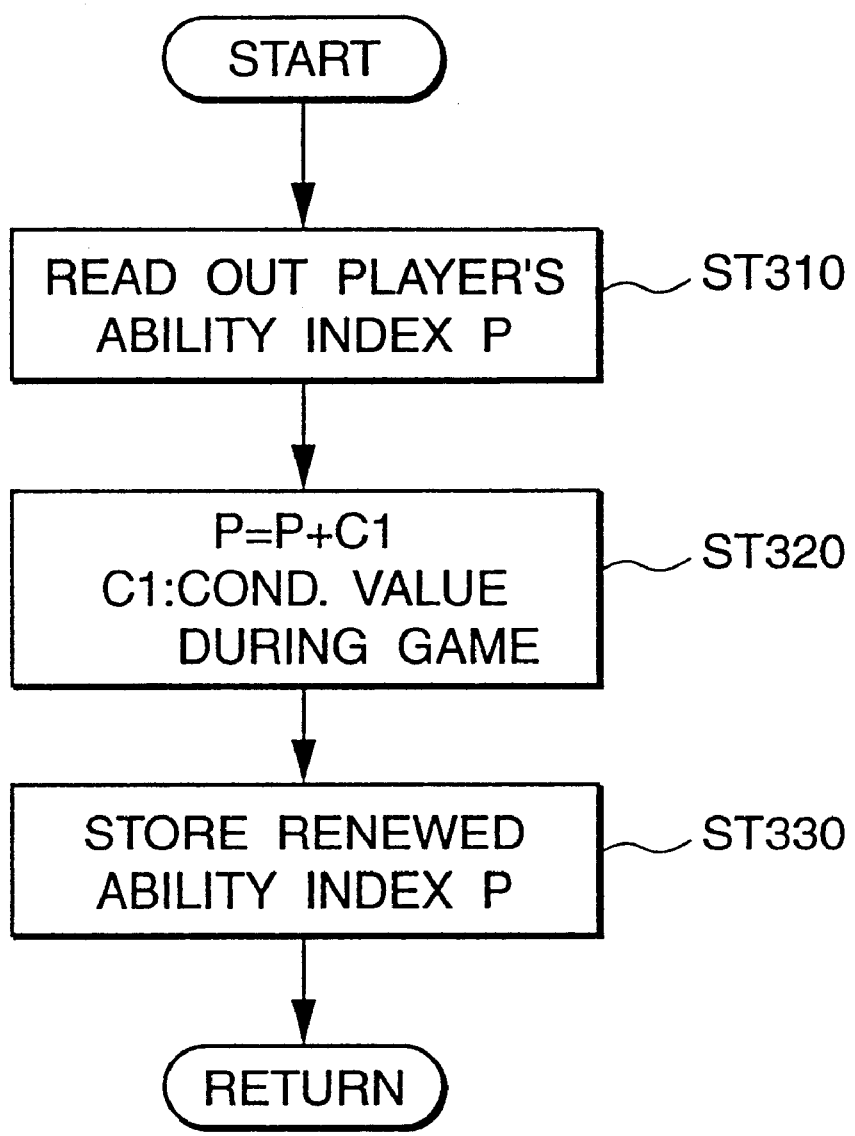
FIG. 10 is a flowchart showing an "Ability Index Changing" routine by an ability index changing means which is executed before the start of the game.

FIG. 10 is a flowchart showing a procedure of an ability index changing routine executed by the ability index changing means 66 before the start of the game.

First, ability indices P of the player character are read from the storage medium 5 (or RAM 8 if they are transferred from the storage medium 5 and stored in the RAM 8 as described with reference to FIG. 1) (Step ST310). Subsequently, P=P+C1 is executed (Step ST320) and the renewed ability indices P are saved in the RAM 8 (Step ST320). The above procedure is executed for each of n (n=11 since the game in this embodiment is a soccer game) player characters to participate in the game.

In Step ST320, C1 is first condition values representing the condition of the player character during the game as described above: "very bad condition: −4", "bad condition: −2", "normal condition: 0", "good condition: 2", "very good condition: 4", "angry condition: 15", and "out-of-touch with game: −12".

Since the value whose absolute value is considerably larger than those for "very bad" condition and "bad" condition in the case of the "out-of-touch with games" condition, the ability indices are considerably reduced if the player character in "out-of-touch with games" condition is exchanged for the player character who experiences an injury event during the game. Thus, the selection of the player characters requires planning, making the game more interesting.

Figure 11:
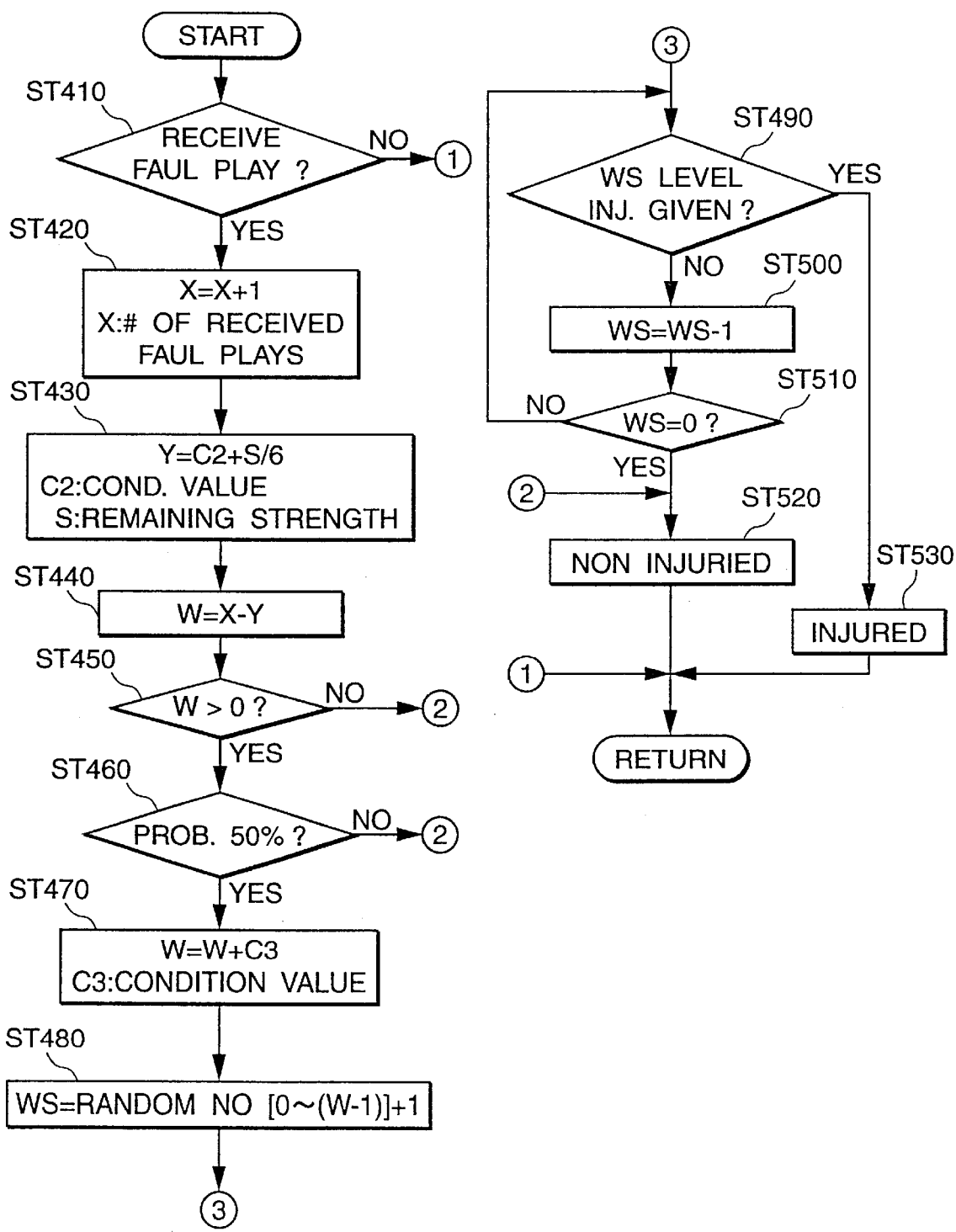
FIG. 11 is a flowchart showing an "Injury Control" routine by an injury control means which is executed during the game.

FIG. 11 is a flowchart showing a procedure of an injury control routine executed by the injury control means 67 during the game.

First, whether the player character of the own team has received a foul play from the player character of the enemy team is judged (Step ST410). This routine ends if he has not (NO in Step ST410), whereas a foul play receiving number X is incremented only by 1: X=X+1 (Step ST420).

Subsequently, Y C2+S/6 is set (Step ST430). Here, C2 and S denote the aforementioned second condition values and a remaining physical strength of this player character, respectively. The remaining physical strength is set at maximum at 12.

Subsequently, W=X−Y is calculated (Step ST440) and whether W>0 is judged (Step ST450). If W≦0 (NO in Step ST450), this routine proceeds to Step ST520 to control the player character not to be injured and ends. On the other hand, if W>0 (YES in Step ST450), this routine proceeds to Step ST460.

Accordingly, the larger the second condition value C2, the smaller the value W. The player character is controlled not to be injured. Here, since the second condition values C2 are set as described above: "very bad condition: 1", "bad condition: 2", "normal condition: 4", "good condition: 5", "very good condition: 6", "angry condition: 6", and "out-of-touch with game: 2", W≦0 if the condition of this player character is set at "out-of-touch with games". Thus, the control not to injure the player character is more frequently executed in this condition than in "very bad" condition, as frequently as in "bad" condition, and less frequently than in "normal", "good", "very good" and "angry" conditions.

Referring back to the routine of FIG. 11, the routine proceeds to "YES" and "NO" at a probability of 50%. If the routine proceeds to "NO", this routine ends after proceeding to Step ST520 to control the player character so as not to be injured.

On the other hand, if this routine proceeds to "YES" in Step ST470, W=W+C3 is calculated (Step ST470). Here, the third condition values C3 are set: "very bad condition: 3", "bad condition: 2", "normal condition: 1", "good condition: 0", "very good condition: 0", "angry condition: 0", and "out-of-touch with game: 2". Accordingly, if the condition of the player character is set at "out-of-touch with games", the value W increases in this condition as much as in "bad" condition although increasing not as much as in "very bad" condition". On the other hand, the value W does not increases if the condition of the player character is set at "good", "very good" or "angry".

Subsequently in Step ST480, a numerical value within a range of 0 to (W−1) is randomly selected using a random number, and an operational value WS is obtained by adding 1 to the selected numerical value. This operational value WS represents an injury level. If WS=1 or 2, the player character can be participate in a game even if he is injured. The larger the operational value WS, the more games the player character cannot participate in.

Subsequently in Step ST490, whether an injury of level WS may be given to the player character is judged. This is to check whether eleven player characters who can participate in a next game can be ensured even if this player character cannot participate in this game due to an injury.

If the injury of level WS may be given to the player character (YES in Step ST490), this routine ends after it is given to the player character (Step ST530).

On the other hand, in the case of a problem of being incapable of ensuring eleven player characters for the next game if the injury of level WS is given to the player character (NO in Step ST490), WS=WS−1 is calculated to reduce the level WS only by 1 (Step ST500). Whether WS=0 is then judged (Step ST510). If WS>0 (NO in Step ST510), this routine returns to Step ST490 to repeat the above operations. If WS=0 (YES in Step ST510), this routine ends after controlling the player character not to be injured (Step ST520).

Steps ST490 to ST510 enable a maximum value of the level WS to be obtained without causing any problem such as an insufficient number of player characters for the next game.

The present invention is not restricted to the foregoing embodiment, and may be embodied as follows.

(1) Although the present invention is applied to a soccer game as a ball game in the foregoing embodiment, it is not restricted thereto. For instance, it is applicable to a baseball game, a basketball game or like ball game for which players to participate in a game are selected for each game. In such cases, a simulated baseball or basketball may be used as the ball character.

(2) Although the present invention is applied to the game in which a plurality of player characters participate as in a soccer game in the foregoing embodiment, it is not restricted thereto. For instance, it is applicable to such a competition in which only a single player participates in a game itself although a plurality of games are set as in a team competition of Judo or a tennis competition fought among different nations, so as to enable the selection of players.

(3) In the foregoing embodiment, if the ability indices are reduced due to "out-of-touch with games" condition, this state is maintained till the end of the game. However, the ability indices may be returned to their original level by eliminating the influence of "out-of-touch with games" condition if a specified condition, e.g. lapse of a half time or scoring a goal is satisfied during the game.

(4) Although the "out-of-touch with games" condition setting routine is executed before the start of each game in the foregoing embodiment, the present invention is not restricted to this mode. For instance, the player character having his condition set at "out-of-touch with games" may maintain this condition until he participates in a game. In this mode, better planning is required for the selection of the player characters, thereby making the selection more difficult.

As described above, the inventive competition video game device for displaying a plurality of simulated games played between an own team and an enemy team on a display means by causing n (≧1) player characters to participate and play in the games, comprises a first storage means for storing m (>n) player characters belonging to the own team, a player selection control means for selecting at least n player characters to participate in the simulated game from the m player characters before each simulated game, and a condition setting means for setting the player character whose consecutive non-participating game number up to the last simulated game is equal to or larger than a specified number in the game sense reduced condition, in which his movements are sluggish when he participates in the simulated game, at a specified probability.

With this construction, a plurality of simulated games played between the own team and the enemy team are displayed on the display means by causing n (≧1) player characters to participate and make specific movements in the games. At this time, at least n player characters to participate in the simulated game are selected from the m (>n) player characters belonging to the own team. Out of the m player characters, the player character whose consecutive non-participating game number up to the last simulated game is equal to or larger than the specified number is set in the game sense reduced condition, in which his movements are sluggish when he participates in the simulated game, at the specified probability. Accordingly, the selection of the player characters which has been monotonous requires planning, thereby making the game more interesting.

The condition setting means may comprise a second storage means whose storage contents are rewritable, a participation judging means for judging whether the player character participated in the simulated game for each of the m player characters upon the completion of the simulated game, a storage control means for saving the consecutive non-participating game number up to the last simulated game in the second storage means for each of the m player characters using the judgment results of the participation judging means, and a consecutive non-participating game number judging means for judging whether the consecutive non-participating game number is equal to or larger than a specified number for each of the m player character based on the storage contents of the second storage means.

With this construction, upon the completion of the simulated game, whether the player character participated in this simulated game is judged for each of the m player characters, and the consecutive non-participating game number s of the respective m player characters up to this simulated game are saved in the second storage means whose storage contents are rewritable, using the above judgment results. The player character(s) whose consecutive non-participating game number is equal to or larger than the specified number can be securely discriminated out of the m player characters by judging whether the consecutive non-participating game number of the player character is equal to or larger than the specified number for each of the m player characters based on the storage contents of the second storage means. Therefore, the game sense reduced condition can be properly set.

Further, the condition setting means may perform the above setting before the start of each simulated game. With this construction, by setting the game sense reduced condition before the start of each simulated game, even if the player character is set in the game sense reduced condition and does not participate in the simulated game to be played, this condition may not be set before the start of a next simulated game since the game sense reduced condition is set for the player character whose consecutive non-participating game number is equal to or larger than the specified number at the specified probability. This leaves a possibility to avoid the selection of the player character(s) set in the game sense reduced condition, thereby making the selection of the player characters even more interesting.

There may be further provided a condition display control means for distinguishably displaying the player characters set in the game sense reduced condition from the remaining ones of the m player characters on the display means when the player characters are to be selected by the player selection control means.

With this construction, by making such a display, whether a game player will selected the player character(s) set in the game sense reduced condition is left up to the game player's will. This makes the selection of the player characters more interesting.

The condition display control means may display face marks having different modes on the display means depending upon whether the player characters are set in the game sense reduced condition. With this construction, the game player can be clearly informed whether the respective characters are set in the game sense reduced condition.

There may be further provided a third storage means for storing ability indices representing degrees of ability of dispositions relating to the simulated game for each of the m player character, a movement control means for causing the player characters to move in manners corresponding to their ability indices in conformity with the rules of the simulated game, and an ability index changing means for temporarily reducing the ability indices of the player character during the simulated game if the player character set in the game sense reduced condition by the condition setting means is selected by the player selection control means.

With this construction, the ability indices representing the degrees of ability of dispositions relating to the simulated game are stored for each of the m player characters, and the player characters are moved in the manners corresponding to their ability indices in conformity with the rules of the simulated game. Accordingly, the player characters can satisfactory perform movements relating to the dispositions having high ability indices. If the player character set in the game sense reduced condition is selected by the player selection control means, the ability indices of this player character are temporarily reduced during the simulated game and, therefore, cannot satisfactorily perform movements. This enables the simulation of a player poorly playing a game due to lack of practice or experience in a real scene, thereby increasing the feel of presence of the game and making it more realistic.

The ability index changing means holds the ability indices of the player character set in the game sense reduced condition reduced until the simulated game is completed.

With this construction, since the ability indices of the player character set in the game sense reduced condition is held reduced until the simulated game is completed, more planning is required for the selection of the player characters, making the game more interesting.

Further, the ability index changing means may restore the ability indices of the player character set in the game sense reduced condition to those before if a specified condition is satisfied during the simulated game.

With this construction, even if the player character set in the game sense reduced condition is selected, his ability indices can be restored to those before by satisfying the specified condition, thereby giving an additional interest to the game. The specified condition may be a nice play of this player character during the simulated game, e.g. scoring.

There may be further provided a condition judging means for judging an occurrence of a specified situation relating to the simulated game given to the player character of the own team by the player character of the enemy team, and an injury control means for setting this player character of the own team in an injured state at a specified probability upon the occurrence of the specified situation. The injury control means may increase the probability of setting the player character in the injured state if he is set in the game sense reduced condition.

With this construction, the player character of the own team is set in the injured state at the specified probability when the specified situation relating to the simulated game is given to him by the player character of the enemy team. At this time, if this player character is set in the game sense reduced condition, the probability of setting him in the injured state is increased. Accordingly, an avoidance of setting the player character in the game sense reduced condition is more strongly demanded. As a result, further more planning is required for the selection of the player characters, making the game even more interesting.

The simulated game may be a ball game for competing scores by driving a ball character simulating a ball into a goal. Thus, the present invention may be applied to a wide range of video games simulating various ball games. The ball game may be a soccer game.

Further, the inventive competition video game executing method for displaying a plurality of simulated games played between the own team and the enemy team on the display means by causing n ($\geq 1$) player characters to participate in the games, comprises the steps of selecting at least n player characters to participate in the simulated game from m ($>n$) player characters, and setting the player character whose consecutive non-participating game number up to the last simulated game is equal to or larger than the specified number in the game sense reduced condition, in which his movements are sluggish when he participates in the simulated game, at the specified probability.

According to this method, a plurality of simulated games played between the own team and the enemy team are displayed on the display means by causing the n ($\geq 1$) to participate and play in the simulated games. At this time, at least n player characters to participate in the simulated game are selected from the m ($>n$) player characters belonging to the own team are selected before each simulated game. Out of the m player characters, the player character whose consecutive non-participating game number up to the last simulated game is equal to or larger than the specified number is set in the game sense reduced condition, in which his movements are sluggish when he participates in the simulated game, at the specified probability. Accordingly, planning is required for the selection of the player characters which has been monotonous, thereby making the game more interesting.

Further, the inventive readable storage means stores a game program of a competition video game for displaying a plurality of simulated games played between the own team and the enemy team on the display means by causing n ($\geq 1$) player characters to participate in the games, comprises the steps of selecting at least n player characters to participate in the simulated game from m ($>n$) player characters, and setting the player character whose consecutive non-participating game number up to the last simulated game is equal to or larger than the specified number in the game sense reduced condition, in which his movements are sluggish when he participates in the simulated game, at the specified probability.

With this readable storage medium, upon reading the game program therefrom and implementing it by a computer, a plurality of simulated games played between the own team and the enemy team are displayed on the display means by causing the n ($\geq 1$) to participate and play in the simulated games. At this time, at least n player characters to participate in the simulated game are selected from the m ($>n$) player characters belonging to the own team are selected before each simulated game. Out of the m player characters, the player character whose consecutive non-participating game number up to the last simulated game is equal to or larger than the specified number is set in the game sense reduced condition, in which his movements are sluggish when he participates in the simulated game, at the specified probability. Accordingly, planning is required for the selection of the player characters which has been monotonous, thereby making the game more interesting.

This application is based on patent application No. 11-133074 filed on May 13, 1999 in Japan, the contents of which are incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A competition video game device for displaying a plurality of simulated games played between an own team and an enemy team on a display means by causing n ($\geq 1$) player characters to participate and play in the simulated games, the competition video game device comprising:

a first storage means for storing m ($>n$) player characters belonging to the own team, a player selection control means for selecting at least n player characters to participate in the simulated game from the m player characters before each simulated game, and a condition setting means for setting the player character, whose consecutive non-participating game number up to the last simulated game is equal to or larger than a specified number, to a game sense reduced condition, in which his movements are sluggish when the game character participates in the simulated game, at a specified probability.

2. The competition video game device according to claim 1, wherein the condition setting means includes:

a second storage means whose storage contents are rewritable, a participation judging means for judging whether the player character participated in the simulated game for each of the m player characters upon the completion of the simulated game, a storage control means for saving the consecutive non-participating game number up to the last simulated game in the second storage means for each of the m player characters using the judgment results of the participation judging means, and a consecutive non-participating game number judging means for judging whether the consecutive non-participating game number is equal to or larger than the specified number for each of the m player character based on the storage contents of the second storage means.

3. The competition video game device according to claim 1, wherein the condition setting means performs the setting before the start of each simulated game.

4. The competition video game device according to claim 1, further comprising a condition display control means for distinguishably displaying the player characters set in the game sense reduced condition from the remaining ones of the m player characters on the display means when the player characters are to be selected by the player selection control means.

5. The competition video game device according to claim 4, wherein the condition display control means displays face marks having different modes on the display means depending upon whether the player characters are set in the game sense reduced condition.

6. The competition video game device according to claim 2, further comprising:

a third storage means for storing ability indices representing degrees of ability of dispositions relating to the simulated game for each of the m player characters, a movement control means for causing the player characters to move in manners corresponding to their ability indices in conformity with rules of the simulated game, and an ability index changing means for temporarily reducing the ability indices of the player character during the simulated game if the player character set in the game sense reduced condition by the condition setting means is selected by the player selection control means.

7. The competition video game device according to claim 6, wherein the ability index changing means holds the ability indices of the player character set in the game sense reduced condition reduced until the simulated game is completed.

8. The competition video game device according to claim 6, wherein the ability index changing means restore the ability indices of the player character set in the game sense reduced condition to those before if a specified condition is satisfied during the simulated game.

9. The competition video game device according to claim 1, further comprising:

a condition judging means for judging an occurrence of a specified situation relating to the simulated game given to the player character of the own team by the player character of the enemy team, and an injury control means for setting a player character of the own team in an injured state at a specified probability upon the occurrence of the specified situation, wherein the injury control means increases the probability of setting the player character in the injured state if the player character is set in the game sense reduced condition.

10. The competition video game device according to claim 1, wherein the simulated game is a ball game for competing scores by driving a ball character simulating a ball into a goal.

11. The competition video game device according to claim 10, wherein the ball game is a soccer game.

12. A competition video game executing method for displaying a plurality of simulated games played between the own team and the enemy team on the display means by causing n ($\geqq 1$) player characters to participate in the games, the method comprising the steps of:

selecting at least n player characters to participate in the simulated game from m (>n) player characters, and setting the player character, whose consecutive non-participating game number up to the last simulated game is equal to or larger than the specified number, to a game sense reduced condition, in which his movements are sluggish when the game character participates in the simulated game, at a specified probability.

13. A readable storage means storing a game program of a competition video game for displaying a plurality of simulated games played between the own team and the enemy team on the display means by causing n ($\geqq 1$) player characters to participate in the games, the storage means comprising the steps of:

selecting at least n player characters to participate in the simulated game from m (>n) player characters, and setting the player character, whose consecutive non-participating game number up to the last simulated game is equal to or larger than the specified number, to a game sense reduced condition, in which his movements are sluggish when the game character participates in the simulated game, at a specified probability.

* * * * *